US006784635B2

(12) United States Patent
Larson

(10) Patent No.: US 6,784,635 B2
(45) Date of Patent: Aug. 31, 2004

(54) VEHICLE ELECTRICAL SYSTEM

(75) Inventor: Gerald L. Larson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/621,285

(22) Filed: Jul. 17, 2003

(65) Prior Publication Data

US 2004/0019441 A1 Jan. 29, 2004

Related U.S. Application Data

(62) Division of application No. 09/945,473, filed on Aug. 30, 2001, now Pat. No. 6,690,140.

(51) Int. Cl.[7] .................................................. H02J 7/00
(52) U.S. Cl. ....................................................... 320/104
(58) Field of Search ............................ 702/63; 320/104, 320/124, 134, 150; 307/9.1, 10.1, 10.7, 10.8

(56) References Cited

U.S. PATENT DOCUMENTS

| 4,723,079 | A | * | 2/1988 | Norton ........................ 307/10.1 |
| 4,845,465 | A | * | 7/1989 | Kruse et al. ................ 307/10.8 |
| 5,444,352 | A | * | 8/1995 | Hutchings .................... 320/104 |
| 5,767,659 | A | * | 6/1998 | Farley .......................... 320/150 |
| 5,982,152 | A | * | 11/1999 | Watanabe et al. ........... 320/150 |
| 6,456,042 | B1 | * | 9/2002 | Kwok .......................... 320/134 |

* cited by examiner

Primary Examiner—Pia Tibbits
(74) Attorney, Agent, or Firm—Jeffrey P. Calfa; Dennis Kelly Sullivan; Susan L. Lukasik

(57) ABSTRACT

A vehicle electrical system is disclosed having a plurality of electrical subsystems for supplying power to different component groups of the vehicle. A voltage regulator is provided each subsystem for setting the voltage on each electrical subsystem independently of the other electrical subsystems. One such subsystem includes a battery having a grounded terminal and an ungrounded terminal. An electrical system controller including data processing capacity provides control of the voltage level on the charging subsystem through a charging regulator having an output connected to the ungrounded terminal of the battery and a control input. An electrical power generator is connected to energize the charging regulator. Instrumentation connected to the electrical system controller provides measurements of current discharged from the battery, current delivered to the battery, and battery temperature. A program residing on the electrical system controller for execution, utilizes battery temperature, battery temperature rate of change and measured current discharged as inputs to an algorithm for dynamically setting a control signal value. The generated control signal is applied to the control input of the charging regulator.

3 Claims, 4 Drawing Sheets

VEHICLE ELECTRICAL SYSTEM

This is a division of application Ser. No. 09/945,473, filed Aug. 30, 2001 now U.S. Pat. No. 6,690,140.

FIELD OF THE INVENTION

The present invention relates to a system for controlling charging of a battery on a motor vehicle equipped with an internal combustion engine and using the battery for starting the engine.

DESCRIPTION OF THE PROBLEM

Lead acid batteries are the conventional source of power for cranking internal combustion engines installed on motor vehicles. Lead acid batteries also provide auxiliary power for components installed on such vehicles for use when the vehicle engine is not operating.

Lead acid batteries operate chemically. The chemical reactions that produce current during discharge are not perfectly reversible during recharge nor are such batteries perfectly stable during periods of nonuse. A battery discharges several hundred amp-seconds during cranking of an engine. In conventional recharging systems developed for automotive applications, recharging occurs during the first few minutes after the engine begins running. Recharging is done more quickly than desirable because automobiles are often operated for short periods of time.

Lead acid batteries are constructed from closely spaced, alternating plates of sponge lead (Pb), which serve as the negative plates, and lead dioxide ($PbO_2$), which serve as the positive plates. The plates are preferably substantially immersed in a sulfuric acid ($H_2SO_4$) water solution, which serves as an electrolyte. During discharge of a battery, lead sulfate ($PbSO_4$) forms on both the negative and positive plates. The concentration of acid in the electrolyte decreases. As the plates become more chemically similar and the acid strength of the electrolyte falls, a battery's voltage will begin to fall. From fully charged to fully discharged each cell loses about 0.2 volts in potential (from about 2.1 volts to 1.9 volts).

Optimally, recharging of a battery would reverse the process of discharge, strengthening the acid in the electrolyte and restoring the original chemical makeup of the plates. However, a battery recharge regimen should also keep a battery fairly fully charged for a variety of vehicle operating conditions. Battery charging systems, particularly those developed for automotive applications, must take into account average driver behavior. Many drivers do not consistently operate their vehicles for distances or times which allow the battery to be recharged at an optimal rate. Thus batteries are typically recharged quickly, resulting in polarization of the battery, overheating, and the electrolytic decomposition of the water from the battery electrolyte into hydrogen and oxygen. Vehicles also sit idle for long periods of time which promotes sulfation in the battery. These factors promote deterioration of a lead-acid battery, shortening the battery's possible service life. In some applications a battery, which could enjoy a service life of a battery from five to eight years, gives as few as three years service.

To some extent sulfation and other factors resulting in the reduction of a lead acid battery's charge capacity can be controlled by avoiding overcharging, or by avoiding overheating of the battery stemming from excessively fast recharging. The development of a vehicle electrical system applicable to certain classes of vehicles which extends battery life is desirable.

To insure that batteries are fully charged, conventional 12 volt vehicle electrical systems operate at an over voltage, typically 14.3 volts. Such high voltages tend to shorten service lives for accessory components, particularly lamps. It is further desirable to provide a vehicle electrical system which does not shorten the service lives of other vehicle accessory components.

SUMMARY

The present invention is directed to an electrical system that satisfies the need for battery charging on a vehicle, and promotes a longer service life for the battery and for accessory components installed on the vehicle. The electrical system comprises a lead acid battery having two terminals. A current sensor is coupled to one terminal of the battery for measuring current sourced from and delivered to the battery. A temperature sensor is positioned proximate to the battery for measuring battery temperature. A controllable voltage regulator which is responsive to a control signal for adjustment of voltage on an output terminal of the regulator supplies a charging current to the battery. The controllable voltage regulator has input and output terminals and is connected by the output terminal to one terminal of the battery for supplying charging current delivered to the battery. An electrical system controller responsive to the measured current sourced from the battery and the measured battery temperature generates the control signal to be applied to the controllable voltage regulator. Energization of the components is provided by an alternator connected to the input of the controllable voltage regulator. The system further includes a lighting system or low voltage circuit and a low voltage regulator connected between the alternator and the lighting system circuit. Voltage on an engine control or high voltage circuit is regulated by an engine control circuit or high voltage regulator connected between the alternator and the engine control circuit.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an abbreviated block diagram schematic of an alternative vehicle electrical system which the present invention can be adapted to operate in.

DETAILED DESCRIPTION OF THE INVENTION

Figure 1:
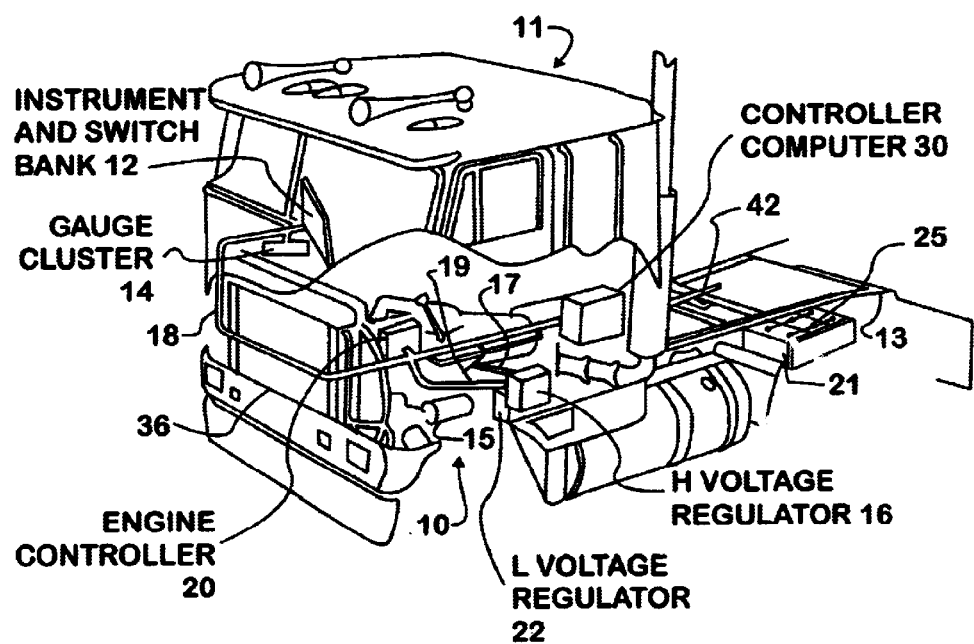
FIG. 1 is a perspective view of a truck in partial cutaway illustrating a vehicle electrical system.

FIG. 1 is a perspective view of a vehicle 11 and of a vehicle electrical system 10 installed on the vehicle. Vehicle electrical system 10 comprises a control network based on a serial data bus 18. One node of bus 18 is an electrical system controller (ESC) 30, a type of programmable body controller, which controls various discrete devices, including a charging regulator 21 for a battery 25. ESC 30 also manages a number of vocational controllers connected to bus 18 as nodes. ESC 30 executes a battery charging management program which aims to keep the battery fully charged as well as controlling the charging regimen to extend battery service life beyond that normally seen in heavy duty truck operation. Vehicle electrical system 10 further includes power systems such as an alternator 15 and it includes voltage regulators 16, 21 and 22, which regulate the voltage on subsidiary electrical systems. The subsidiary electrical systems operate at different voltages. The subsidiary electrical systems include: a low voltage system for energizing lighting, etc.; an intermediate, controllable voltage level system for battery charging; and a high voltage level system providing power to fuel injectors.

Active vehicle components are typically controlled by one of a group of autonomous, vocational controllers, which include an instrument and switch bank 12, a gauge cluster 14, and an engine controller 20, all of which, along with other local controllers, are connected to ESC 30 over serial data bus 18. The autonomous controllers include local data processing and programming and are typically supplied by the manufacturer of the controlled component. For each autonomous controller there is a defined set of variables used for communications between the autonomous controller and other data processing components on the network or attached to the network. Gauge cluster 14, and engine controller 20 all communicate with electronic system controller 30, which also monitors inputs received from the auxiliary instrument and switch bank 12 over the serial communication link in harness 18. Electronic system controller 30 may be programmed to override the normal response characteristics of the gauge cluster 14 and engine controller 20.

Subsidiary electrical systems provide power for recharging battery pack 25, for illuminating electrical lamps 36 and for operating fuel injectors. Separate voltage regulators are provided for the distinct subsidiary systems, including a low voltage 19 for the electrical lamps 36 and a high voltage system 17 for the engine fuel injectors. Of particular interest here is a controllable voltage regulator 21 used for regulating the recharging of battery pack 25, which hangs from a vehicle side rail 13. The output voltage level of controllable voltage regulator 21 is controlled by a control signal from ESC 30, either directly, or over the network. In addition to executing a battery charging management program for determining the level of the control signal for the controllable voltage regulator 21, ESC 30 may execute subsidiary battery diagnostic routines, the results of which may be displayed on gauge cluster 14. ESC 30 may also demand increased engine output from engine controller 20 if required for maintaining, or optimal charging of, battery pack 25.

Figure 2:
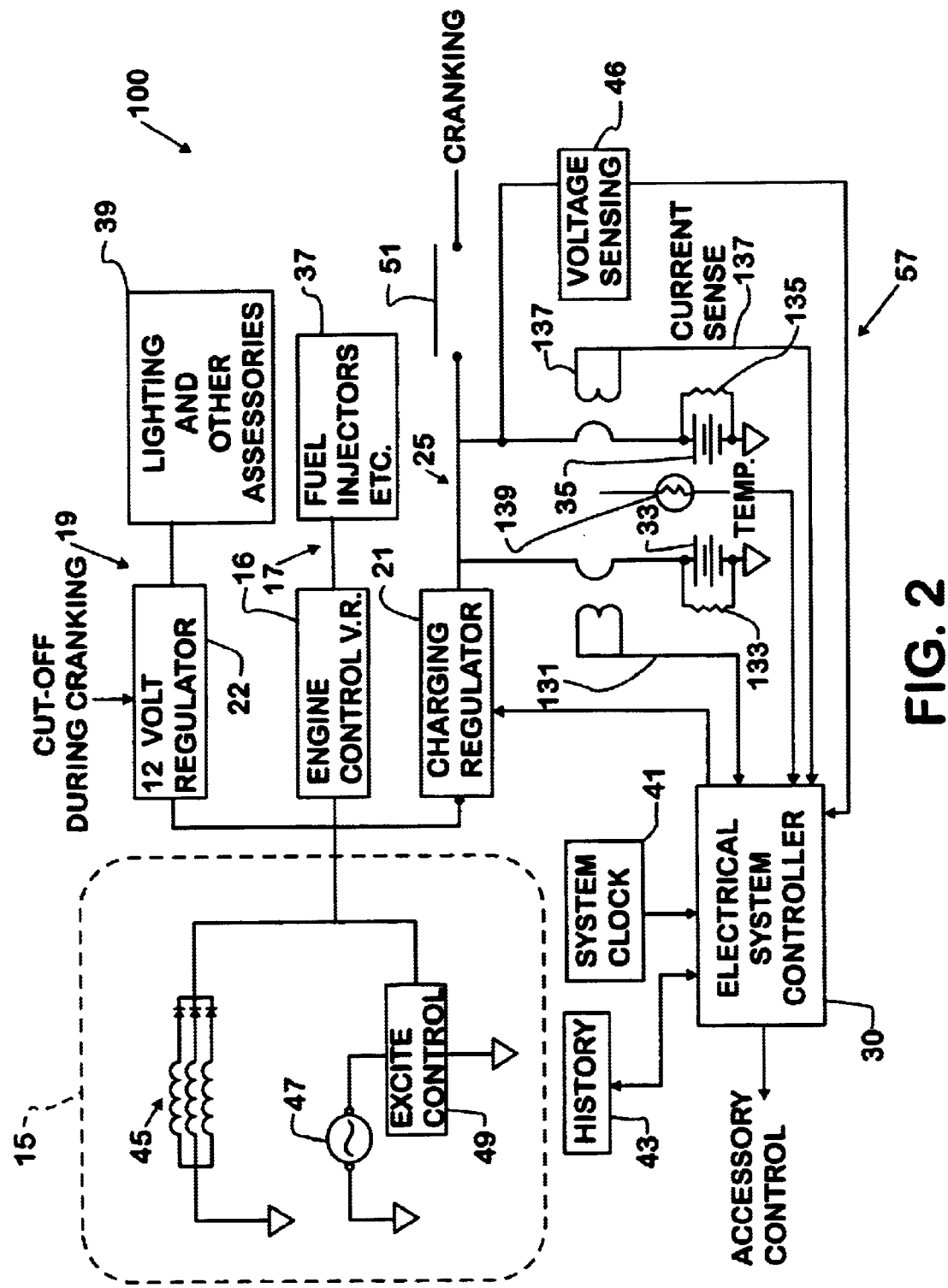
FIG. 2 is a block diagram schematic of the vehicle electrical system incorporating an embodiment of the present invention.

FIG. 2 is a block diagram schematic of a vehicle electrical power system 100. Electrical power system 100 is directed primarily to distributing electrical power generated by an engine 101 driven electrical power source 15, such as an alternator, or generator. Electrical potential is induced in and rectified in power element 45 by a rotor 47. The amount of power generated is controlled by feedback of the output voltage level by an excitation controller 49 which controls the current through magnetic field generating rotor 47. Power source 15 should provide a constant voltage D.C. output at a potential of about 14.3 volts.

Power from alternator 15 may be applied to individual voltage regulators for energizing the three subsidiary electrical systems 17, 19 and 57 of the vehicle power system 100. The voltage level on high voltage system 17 is controlled by an high voltage regulator 16. The voltage level on low voltage 19 is controlled by a low voltage regulator 22, and a battery charging system 57 is controlled by controllable voltage regulator 21.

Low voltage system 19 provides electrical power to a plurality of lamps and other accessories which are designed for 12 volt operation at 12 volts. On trucks particularly, the large number of lamps economically justifies careful control of the voltage applied to the lamps to extend their service lives. Vehicles which use a single voltage regulator off of an alternator are typically set at an overvoltage of about 2.5 volts to the output of the battery in order to assure that the battery is kept charged. Limiting the drive voltage to the lamps to 12 volts by isolating the lamps from the overvoltages required to charge batteries can extend lamp life by an estimated 15%. As is conventional, lighting 39 is cutoff during engine cranking to conserve power. Here low voltage regulator 22 is disabled by a cranking indication signal applied as a cranking cut-off signal to the regulator.

A high voltage regulator 16 provides power to high voltage system 17 which includes fuel injectors 37. Here the voltage regulator 16 may advantageously be set to provide an output of 14.3 volts.

Controllable voltage regulator 21 controls the voltage level applied to the (usually) positive terminal of a battery pack 25 and does not have a fixed output level. Instead, the output voltage from controllable voltage regulator 21 is set by the value of a control signal supplied from electrical system controller 30. The control signal is time varying and is set as a function in several variables. An output terminal of controllable voltage regulator 21 is connected to the positive terminals of battery (pack) 25, which may include more than one six cell lead acid battery, connected in parallel. Illustrated are two such batteries 33 and 35. Shown in parallel to batteries 33 and 35 are resistors 133 and 135 which represent the internal resistances of the corresponding batteries. The positive terminals of battery pack 25 are also connectable by a switch 51 to a starter motor 39.

Instrumentation sensors are used to collect data for the battery charging control regimen programmed into electrical system controller 30. Among these sensors are current sensors 131 and 137, i.e. one for each of batteries 33 and 35 (collectively battery pack 25). Current sensors 131 and 137 provide measurements both of current drawn from and delivered to the batteries. Electrical system controller 30 integrates these signals to generate figures for total energy drawn from and returned to battery pack 25 (in watt-minutes). This in part allows the electrical controller 30 to assure that as much current is returned to the batteries as is required to replace current drawn during starting. The instrumentation also allows setting the rate of current return at a level which will not damage the battery. A temperature sensor 139 provides temperature readings of the battery 25 to the electrical system controller, which allows losses during charging to be estimated and further allows certain diagnostic routines, which are not part of the invention, to be executed. Finally a voltage sensor 46, connected to the positive terminal of battery pack 25 to provide voltage level signals to electrical system controller 30, may be used, primarily for diagnostic purposes and as a check to insure that during float charging, a minimum voltage to insure charge maintenance is applied to batteries 33 and 35.

Electrical system controller 30 also has access to battery history data 43, with which to estimate battery losses during charging and a system clock 41, used to determine the time rates of change for data received from the instrumentation package.

During starting, current sensors 131 and 137 and voltage sensor 46 provide time varying signals indicating instantaneous current drawn from and output voltage supported by battery pack 25. ESC 30 receives these signals and integrates them to determine the total current energy supplied in amp-minutes. After the engine starts, ESC 30 determines the power to be returned to battery pack 25, including an amount to compensate for an estimation of losses based on battery history 43. The rate at which current is to be returned is determined by reference to battery temperature. The voltage level provided by controllable voltage regulator thus is a function of battery temperature, battery current voltage and battery history 43. Battery history may include anticipated run time of the vehicle engine 101, which if short in duration leads to use of a higher charging current.

Figure 3:
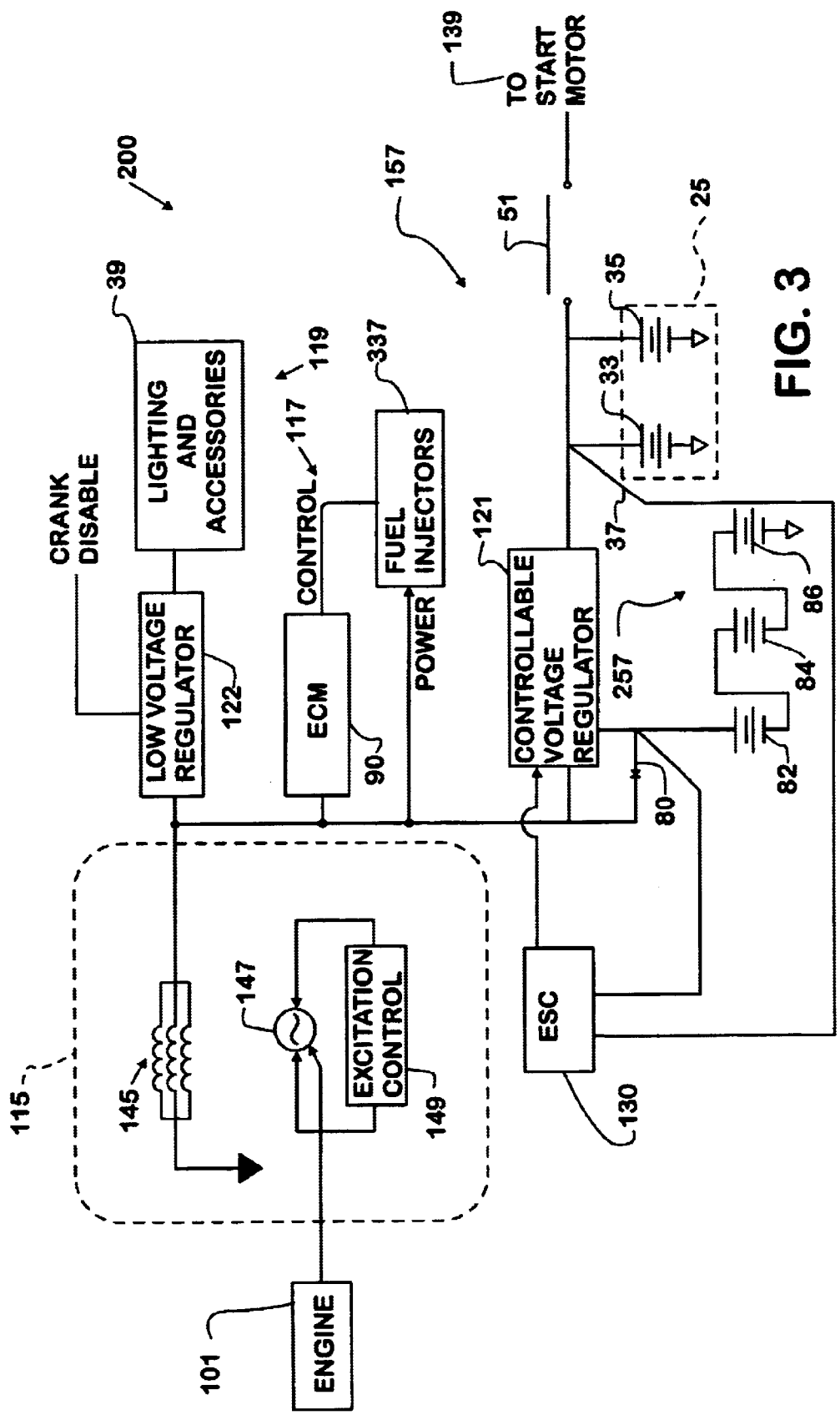

FIG. 3 is a block diagram schematic of a vehicle electrical power system 200. Each generation of motor vehicles has exhibited increased requirements for electrical power over the previous generation. This stems from demands by vehicle operators for greater creature comforts in autos and trucks and the advantage of electrically powering components traditionally powered by belts off of the engine. Air conditioning pumps and power steering pumps are examples of such devices. Meeting these power requirements with traditional 12 volt systems has proven increasingly challenging. As a result vehicle electrical systems have been proposed which provide for battery storage at 36 volts and generating power at 42 volts. Hybrid systems operating different components at substantially different voltages have also been proposed to allow continued use of some 12 volt components. Electrical power system 200 is a possible multiple voltage level system.

Alternator 115 provides electrical power induced in power element 145 by a rotor 147 which is driven by engine 101. The amount of power generated is controlled by feedback of the output voltage level by an excitation controller 149 which controls the current through magnetic field generating rotor 147. Alternator 115 provides a rectified D.C. voltage output of about 42.0 volts.

Power from alternator 115 is applied to individual the subsidiary electrical systems of the vehicle power system 200. These systems include, a high voltage system 117 providing electrical cower to a fuel injection system 337 powered directly from alternator 115, a low voltage system 119 incorporating a 12 volt low voltage regulator 122 which in turn powers lighting and other accessories 39, a first battery charging system 157 and a second battery charging system 257 which provides output power at two controllable levels through a two stage controllable voltage regulator 121.

Low voltage system 119 provides electrical power at 12 volts to a plurality of lamps and other accessories which are designed for 12 volt operation. Low voltage system 119 is essentially unchanged from the embodiment described with reference to FIG. 2, except that low voltage regulator 122 must handle stepping voltage down from 42 volts to 12 volts instead of from 14.5 volts to 12 volts.

Contemporary fuel injectors require power somewhat above 42 volts. Redesigned injectors are anticipated which can be directly powered from power source 115 at 42 volts. Engine control manager 90 controls timing of the injectors.

Two stage controllable voltage regulator 121 is used to control the voltage level applied to the (usually) positive terminal of 12 volt battery pack 25 (two parallel connected batteries 33 and 35 ) and a second voltage level applied to an output terminal from series connected batteries 82, 84 and 86. Two stage controllable voltage regulator 121 does not have fixed output levels. Instead, the output voltages from controllable voltage regulator 121 are set by control signals supplied from electrical system controller 130. The control signals are time varying and are set as functions in several variables. An output terminal of controllable voltage regulator 121 is connected to the positive terminals of battery (pack) 25. The positive terminals of battery pack 25 are also connectable by a switch 51 to a starter motor 39. A second output terminal of two stage controllable voltage regulator 121 provides power to charge series connected batteries 82, 84 and 86, which are six cell lead acid batteries of conventional construction. These batteries are instrumented similarly to batteries 33 and 35. The series connected batteries 82, 84 and 86 are connected by a diode 80 to a main power bus to supply initial power to fuel injectors 137. The diode 80 prevents direct charging of the series connected batteries 82, 84 and 86 from alternator 115.

Instrumentation sensors are used to collect data for the battery charging control regimen established by electrical system controller 130 in a manner similar to that utilized in FIG. 2. Charging of both sets of batteries is controlled in a manner analogous to that proposed for a 12 volt system.

Figure 4:
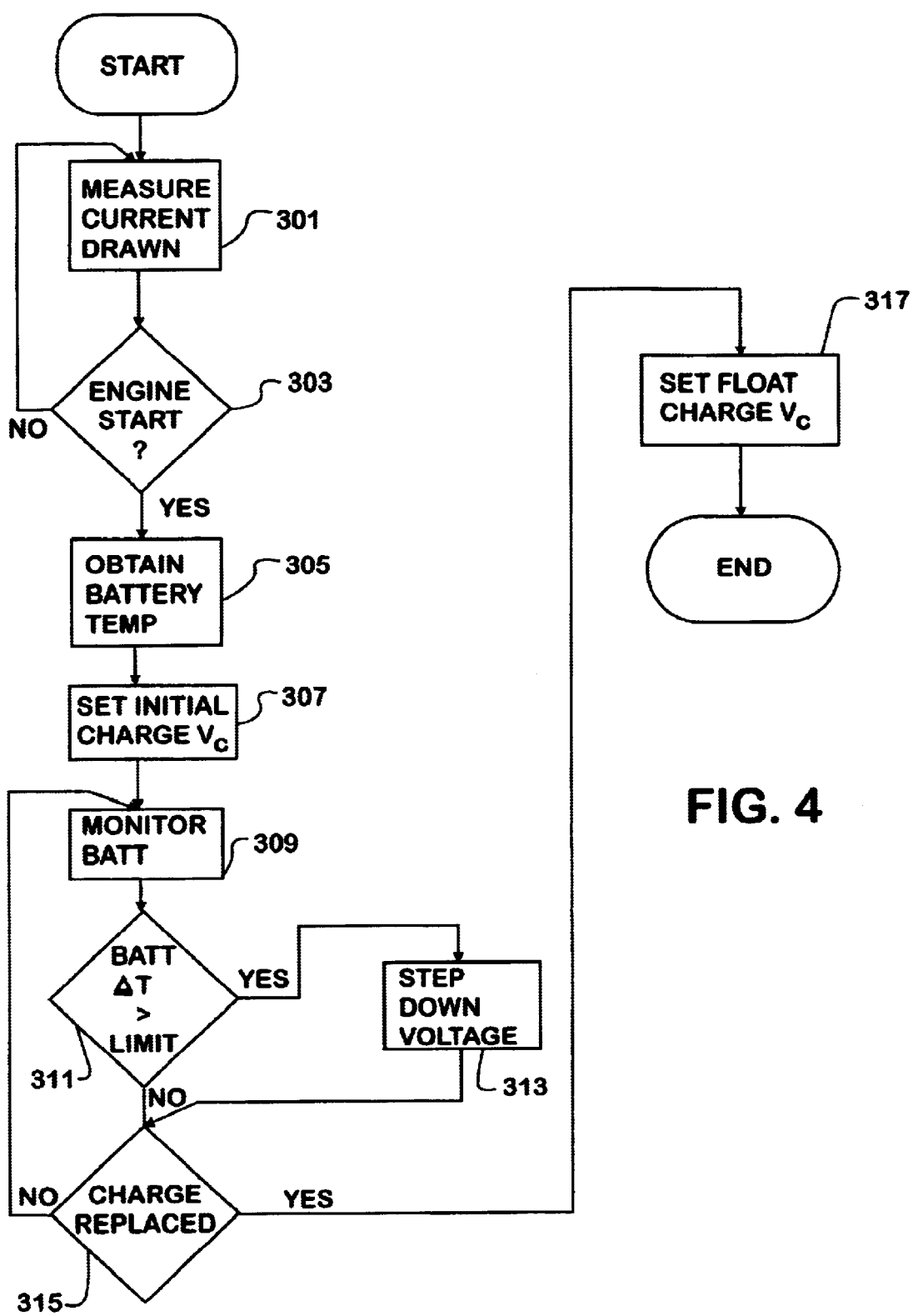
FIG. 4 is a flow chart of a battery charging control program.

The battery charging regimen is represented in the high level flow chart of FIG. 4. Initially current drawn is measured and integrated at step 301 until an engine starts (step 303). The battery temperature is then measured (step 305) in order to set an initial charge rate (step 307). Charging begins and current into the battery is monitored (step 309). Battery temperature continues to be monitored and if the time rate of change of battery temperature exceeds a delta limit (step 311), the control signal to the charging regulator is adjusted (step 313) to step down the voltage output from the charging regulator. The cycle continues until the battery charge has been replaced, including an allowance for internal losses (step 315). A battery state of charge estimate may be obtained from the battery history 43 or a technical specification of the battery and the battery temperature. Temperature changes and rates of changes should fall within certain limits and a temperature transition outside of those limits can indicate battery damage. Once battery charge is replaced the control signal is reset to set the output voltage or voltages of the controllable regulators 21 or 121 to maintain a float charge to battery pack 25 and/or to batteries 82, 84 and 86 to compensate for current leakage (step 317).

The present invention provides a vehicle electrical power system that satisfies the need for battery charging on a vehicle while simultaneously promoting a longer service life for the battery. Battery overheating and overcharging are avoided by control of the voltage level applied to the ungrounded battery terminals. In addition, accessory components installed on the vehicle are protected from overvoltages used to charge the battery by provision of separate voltage regulators. Components which usually exploit overvoltages are placed in yet another subsystem with an individually set voltage level.

While the invention is shown in only one of its forms, it is not thus limited but is susceptible to various changes and modifications without departing from the spirit and scope of the invention.

What is claimed is:

1. A vehicle electrical system comprising:
   a battery having a grounded terminal and an ungrounded terminal;
   an electrical system controller;
   a charging regulator having an output connected to the ungrounded terminal of the battery and responsive to a control signal received on a control input;

an electrical power generator connected to supply electrical power to the charging regulator;

instrumentation connected to the electrical system controller for providing measurements of current discharged from the battery, current delivered to the battery, and battery temperature;

a program residing on the electrical system controller for execution, the program utilizing battery temperature, battery temperature rate of change and measured current discharged as inputs for periodically setting a value for the control signal; and means for coupling the control signal to the control input of the charging regulator.

2. A vehicle electrical system as set forth in claim 1, further comprising:

a plurality of electrical subsystems for supplying power to different component groups of the vehicle; and a plurality of voltage regulators for setting the voltage on selected electrical subsystems independently of the other electrical subsystems.

3. A vehicle electrical system as set forth in claim 2, further comprising:

a second battery connected to provide power at a different voltage than the first battery set.

* * * * *